United States Patent [19]

Ghany

[11] 4,044,985

[45] Aug. 30, 1977

[54] CANDLE MAKING APPARATUS

[76] Inventor: Michael Ghany, 120 Harbord Street, Toronto, Ontario, Canada

[21] Appl. No.: 738,032

[22] Filed: Nov. 2, 1976

[51] Int. Cl.$^2$ .................................................. B29C 1/00

[52] U.S. Cl. .................................... 249/205; 425/122; 425/126 R; 425/214; 425/803

[58] Field of Search ................ 425/126 R, 126 S, 110, 425/803, 122, 214; 249/205

[56] References Cited

U.S. PATENT DOCUMENTS

| | | | |
|---|---|---|---|
| 9,696 | 5/1853 | Kendall | 425/122 |
| 242,630 | 6/1881 | Gottstein | 425/122 |
| 280,566 | 7/1883 | Brelivet | 425/122 |
| 284,785 | 9/1883 | Werk | 425/122 |
| 545,356 | 8/1895 | Fournier | 425/122 |

*Primary Examiner*—Robert L. Spicer, Jr.
*Attorney, Agent, or Firm*—Allen D. Brufsky

[57] ABSTRACT

Apparatus used in candle manufacture including means for dispensing and holding a length of wick material threaded through an upright needle, and means for clamping a candle mold in surrounding relation to the needle and wick material. After the candle hardens in the mold it is removed from the needle and the wick material remains in the candle.

10 Claims, 2 Drawing Figures

CANDLE MAKING APPARATUS

BACKGROUND OF THE INVENTION

This invention relates to candle making apparatus and more particularly, the apparatus for dispensing and holding a length of wick material in the center of a candle wax mold.

The apparatus of the present invention facilitates the placing of a wick in the center of a molded wax candle. Heretofore, such a procedure was time consuming and laborious, often being done manually.

SUMMARY OF THE INVENTION

In accordance with the invention, a spool containing a continuous supply of wick material is rotatably mounted on a spindle. The wick material is removed from the spool against fricturial drag on the spool and threaded around a pair of pulleys and through a needle bar containing an elongated upright needle. The wick material is then threaded through the top of the needle. A candle mold holder which clamps a candle mold in an upright position, is placed over the needle and the end of the wick material is fixed to the holder. The mold is then clamped to the holder about the needle and wick material, which is centrally located in the mold when wax poured into the mold hardens, the mold is removed from the holder and needle and the wick material cut where it enters the bottom of the mold, leaving the wick in the candle wax.

BRIEF DESCRIPTION OF THE DRAWING

Further objects and advantages of the invention will become apparent from the following description and claims and from the accompanying drawing, wherein:

DETAILED DESCRIPTION OF THE PREFERRED EMBODIMENT

Figure 1:
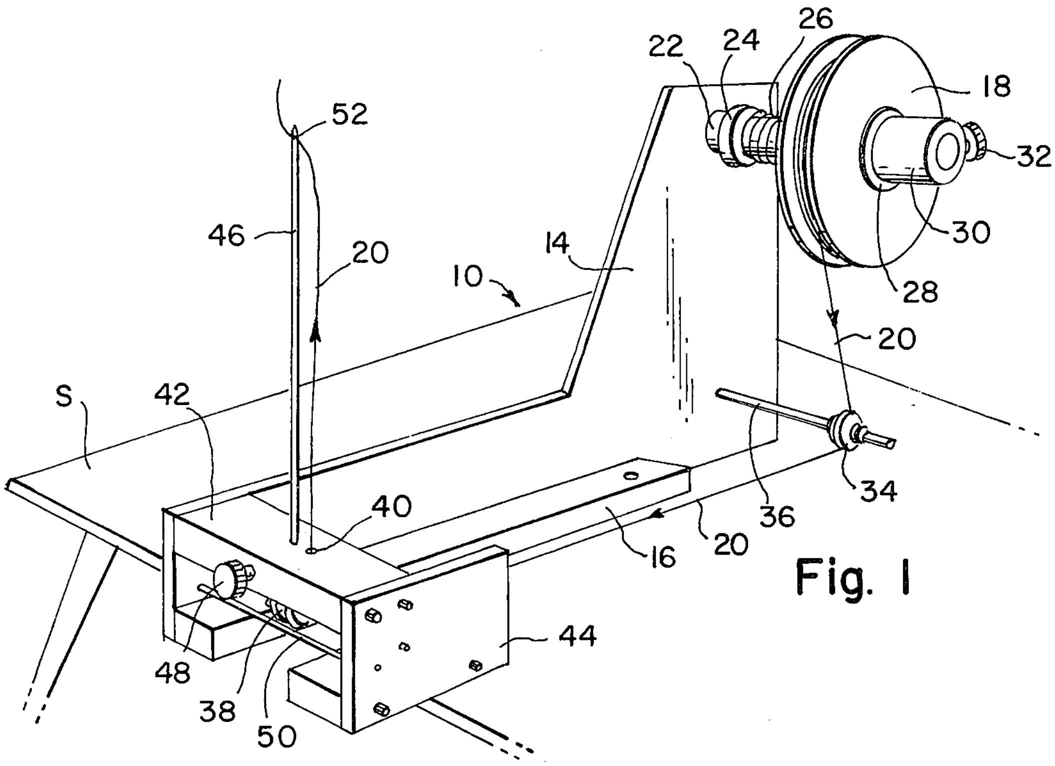
FIG. 1 is a perspective view of the wick material dispenser of the candle making apparatus of the present invention.

Referring now the drawing in detail, wherein like numerals indicate like elements throughout the several views, the candle making apparatus of the present invention includes a wick material dispenser 10 and a candle mold holder 12.

Wick material dispenser 10 includes an upright support plate 14 secured by a base plate 16 to a planar surface S, such as a table top. A spool 18 containing a continuous supply of wick material 20 is rotatably mounted on a shaft 22 connected to support plate 14. A collar 24 is secured by an Allen screw or the like to shaft 22 and retains a coil spring 26 under compression between collar 24 and spool 18. Spring 26 urges spool 18 against a friction disc 28 held on shaft 22 by a locking collar 30. Collar 22 is secured to the end of shaft 22 by a thumbscrew 32. The urging of spool 18 against friction disc 28 precludes undue rotation of spool 18 as wick material 20 is pulled from the spool. Wick material 20 can only be pulled from the spool as spool 18 rotates on shaft 22 against the frictional drag of disc 28.

When wick material 20 is removed from spool 18, it is threaded around a pulley 34 mounted on a shaft 36 projecting from support plate 14, a second pulley 38 downstream from pulley 34 mounted on a similar shaft, and through a hole 40 in a needle bar 42 mounted between plate 14 and a support plate 44 supported on planar surface S. Needle bar 42 mounts an elongated needle 46 held in an upright position on bar 44 by a thumbscrew 48. A support bar 50 extends between plates 14 and 44 and serves as a restraint for wick material 20 should it drop from hole 40.

After wick material 20 is threaded through hole 40 it is inserted through the eye 52 of needle 46.

Figure 2:
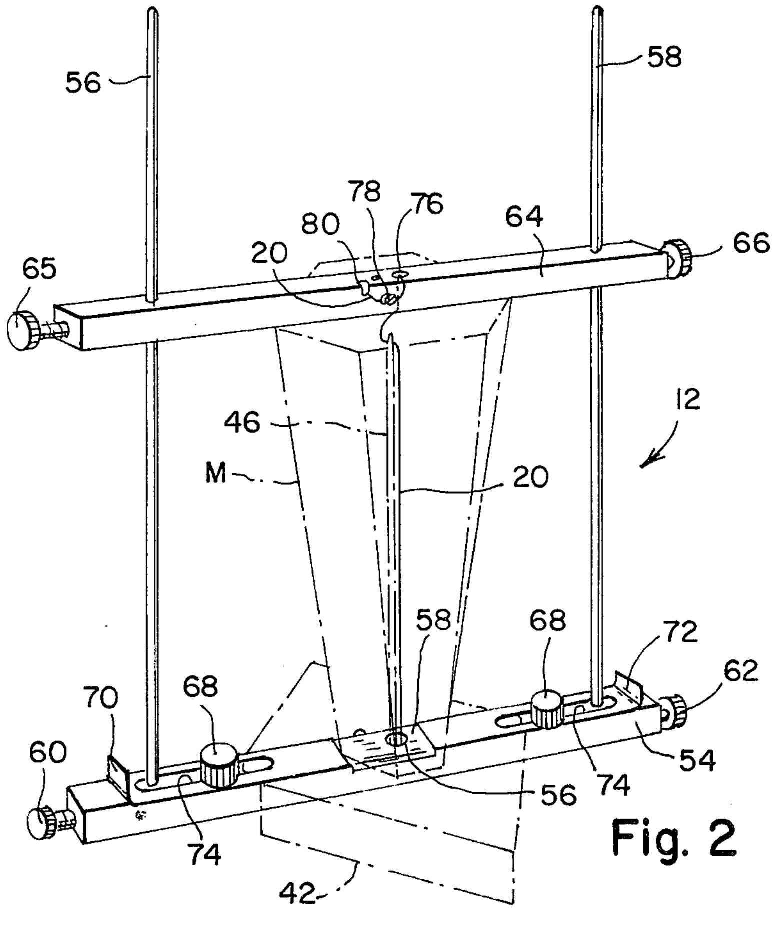
FIG. 2 is a perspective view of the mold holder of the candle making apparatus of the present invention.

As shown in FIG. 2, candle mold holder 12 includes a bottom clamp bar 54 having a hole 56 therethrough surrounded by a gasket seal 58 which receives needle 46 and wick material 20 connected to needle 46 therethrough. A candle mold M, shown in phantom lines, is filled with molten wax and positioned on bottom clamp bar 54 in surrounding relation to needle 46 and wick material 20.

A pair of guide rods 56 and 58 are mounted in holes on bottom clamp bar 54 and held in an upright position by thumbscrews 60 and 62, respectively. An upper clamp bar 64 is slidably and adjustably mounted on guide rods 56 and 58 and when in contact with the top of mold M clamps the mold M to bottom bar 54. Thumbscrews 65 and 66 fix upper clamp bar 64 to rods 56 and 58, respectively.

Mounted by thumbscrews 68 on bottom clamp bar 54 are a pair of slides 70 and 72. Each slide includes an elongated slot 74 which receives therethrough a guide rod and one of the thumbscrews 68. Slides 70 and 72 can be moved towards mold M on bar 54, when screws 68 are loosened to laterally abut and clamp mold M therebetween. The screws 68 can then be retightened.

The end of the wick material 20 for forming the exposed portion of the wick of the molded candle is inserted through a hole 76 in upper clamp bar 64, wound about a stud 78 secured to the bar 64 and placed under a clip 80 on bar 64 after bar 64 is placed in clamping relation to mold M. When the wax in mold M hardens, the mold is removed from the holder 12 and needle 46 and the wick material 20 cut where it enters the bottom of the mold through opening 56, leaving a wick in the candle wax, with an exposed upper length provided by the material wrapped about stud 78. The hole left in the bottom of the candle by removal of needle 46 may be covered if desired by reheating the bottom of the candle and smoothing wax over the hole.

I claim:

1. Candle making apparatus comprising:

a wick dispenser including a support means on said support for rotatably mounting a spool containing a continuous length of wick material, means on said support spaced from said spool for mounting a substantially vertical needle having an eye, means on said support between said spool and needle for guiding said wick material from said spool through the eye of said needle, and a candle mold holder including a bottom clamping bar having a hole therethrough receiving said needle and threaded wick material, a pair of upright guide rods on said bottom clamping bar, and a top clamping bar slidably adjustable along said rods for cooperation with said bottom clamping bar for clamping a candle mold therebetween about said needle and threaded with material.

2. Apparatus in accordance with claim 1 including means on said top clamping bar for securement to the end of said wick material threaded through the eye of said needle.

3. Apparatus in accordance with claim 2 wherein said securement means includes a stud threadedly connected to said top clamping bar.

4. Apparatus in accordance with claim 1 including laterally adjustable clamping means on said bottom clamping bar for abutment with a mold.

5. Apparatus in accordance with claim 4 wherein said laterally adjustable clamping means includes a pair of slides adjustable along the length of said bottom clamping bar.

6. Apparatus in accordance with claim 1 wherein said guide means includes a pair of spaced pulleys rotatably mounted on said support, and a hole in said needle mounting means.

7. Apparatus in accordance with claim 6 including a wick material retaining support shaft on said support positioned beneath the hole in said needle mounting means.

8. Apparatus in accordance with claim 1 wherein said means rotatably mounting said spool includes a shaft fixed to said support.

9. Apparatus in accordance with claim 8 including friction brake means on said shaft for restraining rotation of said spool on said shaft.

10. Apparatus in accordance with claim 9 wherein said friction brake means includes a collar on said shaft, a disc fixed to said shaft in frictional engagement with said spool, and a coil spring under compression on said shaft between said collar and said spool urging said spool against said disc.

* * * * *